(12) United States Patent
Leeke et al.

(10) Patent No.: US 12,314,436 B2
(45) Date of Patent: May 27, 2025

(54) VIDEO MASKING OF SENSITIVE INFORMATION

(71) Applicant: Verint Americas Inc., Alpharetta, GA (US)

(72) Inventors: Selwyn Leeke, Vancouver (CA); Wayne Burkett, Providence, RI (US); Donal Ryan, Drogheda (IE)

(73) Assignee: Verint Americas Inc., Alpharetta, GA (US)

( * ) Notice: Subject to any disclaimer, the term of this patent is extended or adjusted under 35 U.S.C. 154(b) by 203 days.

(21) Appl. No.: 18/152,698

(22) Filed: Jan. 10, 2023

(65) Prior Publication Data

US 2024/0232425 A1 Jul. 11, 2024

(51) Int. Cl.
*G06F 21/62* (2013.01)
*G06F 9/451* (2018.01)
*G06F 21/84* (2013.01)

(52) U.S. Cl.
CPC .......... *G06F 21/6245* (2013.01); *G06F 9/451* (2018.02); *G06F 21/84* (2013.01); *G06F 2221/032* (2013.01)

(58) Field of Classification Search
CPC ................ G06F 21/6245; G06F 21/84; G06F 2221/032; G06F 9/451
See application file for complete search history.

(56) References Cited

U.S. PATENT DOCUMENTS

| | | | |
|---|---|---|---|
| 2006/0028488 A1* | 2/2006 | Gabay | H04L 65/1101 345/626 |
| 2020/0151348 A1* | 5/2020 | Chauhan | H04L 67/53 |
| 2021/0312080 A1* | 10/2021 | Ramamurthy | G06F 21/6245 |
| 2021/0373976 A1* | 12/2021 | Lewis | G06F 9/542 |
| 2022/0188455 A1* | 6/2022 | Mukherjee | G06F 21/629 |

* cited by examiner

*Primary Examiner* — Theodore C Parsons
(74) *Attorney, Agent, or Firm* — Dinsmore & Shohl LLP

(57) ABSTRACT

Certain aspects of the present disclosure provide techniques for masking sensitive information in a data stream, comprising: receiving a request to record an image data stream associated with a graphical user interface; instantiating a display capturer configured to capture the image data stream associated with the graphical user interface; instantiating a virtual display configured to virtually display: an image layer comprising the image data stream associated with the graphical user interface; and a mask layer configured to mask sensitive information in the image data stream; and determining a mask layer state based on at least one of: a state of the graphical user interface; or a comparison of the mask layer at a first time and at a second time.

20 Claims, 7 Drawing Sheets

VIDEO MASKING OF SENSITIVE INFORMATION

INTRODUCTION

Aspects of the present disclosure related to systems and methods for masking sensitive information in a data stream.

BACKGROUND

Screen capturing software allows capture and recording of an on-screen display as an image or a video. Screen capture images or videos may be used for sharing, collaborating, and monitoring of on-screen activity. However, screen capture recordings generally record all the information displayed on the on-screen display, including any sensitive or private information.

Personally identifiable information ("PII") is generally any representation of information that permits the identity of an individual to whom the information applies to be reasonably inferred by either direct or indirect means. PII includes information that can be used to distinguish or trace an individual's identity (e.g., name, social security number, date and place of birth, biometric records, etc.), either alone or when combined with other personal or identifying information that is linked or linkable to a specific individual (e.g., medical, educational, financial, employment information, and the like).

Breach and exploitation of PII may result in harm to individuals including identity theft, forged identity documents, financial loss, reputational harm, emotional harm, and even reduced personal safety. Due to advancements in technology, personal information is increasingly collected, transmitted, stored, maintained, and processed. As such, there in an increase in regulations restricting how and when PII may be transmitted and/or stored. Regulations require PII to be protected through secure transmission methodologies, encrypted storage, limited access to digital and physical documentation, and corrective or remedial actions if PII is compromised.

Methods of protecting PII include reducing or avoiding collection of unnecessary sensitive information, which may include PII. There is a desire to screen capture desktop and mobile applications for a variety of reasons, such as testing, exploring user experience, and reviewing functionality, but it is desirable, and sometimes a legal necessity, to capture screens without collecting sensitive information or PII.

Accordingly, there is a need for improved methods for masking sensitive information in a data stream.

SUMMARY

Certain aspects provide a method of masking sensitive information in a data stream, comprising: receiving a request to record an image data stream associated with a graphical user interface; instantiating a display capturer configured to capture the image data stream associated with the graphical user interface; instantiating a virtual display configured to virtually display: an image layer comprising the image data stream associated with the graphical user interface; and a mask layer configured to mask sensitive information in the image data stream; and determining a mask layer state based on at least one of: a state of the graphical user interface; or a comparison of the mask layer at a first time and at a second time.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
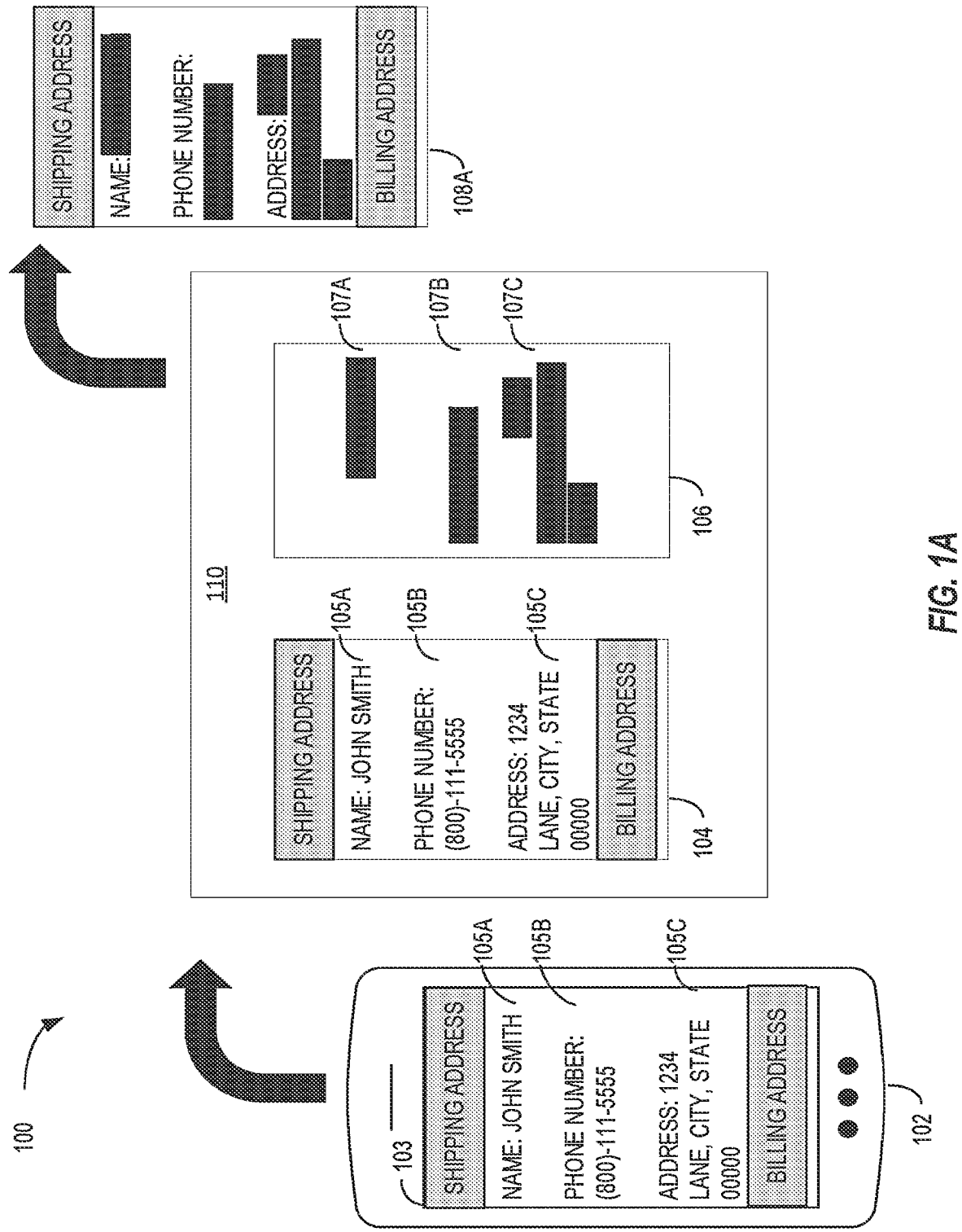
FIGS. 1A-1B depict various aspects of a screen capture recording.

Aspects of the present disclosure related to systems and methods for masking sensitive information in a data stream, such as may be created by a screen capture application. A screen capture recording (a type of data stream) captures the contents of a display as an image (e.g., screenshot) or video (e.g., screencast), which is generally a sequence of still images or frames.

To avoid capturing sensitive data, a screen capture recording may record only a portion of the data on a display by skipping or masking sensitive information in the recording. In order to avoid capturing sensitive data, a conventional screen capture recording system must first determine when sensitive information is displayed in the image data stream and then omit from recording or otherwise delete frames containing sensitive information from the recording. Then, the final screen capture recording comprises a series of frames capturing the display data, but omits any frame containing sensitive data. While this conventional method allows a screen capture application to record an on-screen display without recording sensitive information, the omission of image data frames to avoid recording sensitive information may result in jarring, chunky, and confusing recordings because there may be large gaps between frames without sensitive information leading to a recording that either skips asynchronously through time, or which includes significant periods without video data. Notably, frames omitted from the final recording may often include non-sensitive, but useful, image information, which is omitted along with the sensitive information, which reduces the utility of the screen capture recording.

For the aforementioned video quality reasons, it is preferable that sensitive information in an image data stream be masked more finely (e.g., without masking non-sensitive information) during a continuous recording of the display. However, to do so presents a technical problem because a screen capture recording system must determine precisely where sensitive information is located on a display to apply precise masks (e.g., visual blocks) that do not block other, non-sensitive information. This is difficult when image data is not encoded in a manner that allows a masking application to determine where sensitive information is rendered on a display so that an appropriate precise mask can be applied. Moreover, when the sensitive information is dynamic (e.g., moving, zooming, being entered, etc. on the screen as part of a graphical user interface), it is even more technically challenging to determine where to apply masks.

Further yet, conventional applications for masking sensitive information may generally rely on recording exactly what is displayed on a physical screen (e.g., from image data written to a display buffer), which limits the opportunity for processing the image data and determining where to apply precise masks. In fact, the compute load of trying to determine precise mask locations when recording image data from a traditional display buffer may negatively affect the performance of the displaying device, such as by causing compute stalls, display artifacts, buffering, and the like.

The ability to identify and automatically mask sensitive information in a data stream independently of the image data that is to be displayed on a physical screen may significantly improve the ability to determine locations for and apply precise masks to obscure sensitive data while maintaining the performance of the user's experience (e.g., in terms of the display of image data on a physical display device). Accordingly, aspects described herein implement a virtual display including, for example, an image data layer that is configured to virtually display image data destined for a physical display device and a mask layer configured to apply different types of mask elements, including precise masks and coarse masks depending on the state of the graphical user interface generating the image data. The screen capture recording is based on a combination of the virtual image data layer and mask layer, rather than based on the data displayed on the physical display device.

In some aspects, the improved masking system described herein is configured to automatically identify image data to be masked and to automatically generate corresponding mask elements in the mask layer and to recognize when, for one reason or another, it is not possible to determine where the sensitive information is in the image data layer (e.g., during graphical user interface movements, transitions, overloads, etc.) to ensure sensitive data is masked at all times in the screen capture recording. Beneficially, such aspects advantageously produce a smoother quality screen capture recording with more useful image data but without disrupting the user experience, as well as improved device performance, and improved control over recording quality, all while preventing sensitive information from being captured in the screen capture recording.

Example Screen Capture Recoding Data Flows

FIG. 1A depicts various aspects of a screen capture recording flow 100. Generally, a graphical user interface 103 on a user device 102 may contain any number and style of graphical user interface elements, such as the example graphical user interface elements 105A-C (collectively, 105). Note that while user device 102 is depicted throughout as one example device that may perform screen capturing, any electronic device with the capability to generate video image data (e.g., moving image video frames) might similarly implement the methods described herein. For example, user device 102 could be a tablet computer, desktop computer, a smart device, a smart wearable device, or generally any computer processing device including a graphical user interface with the ability to display user data.

As depicted in FIG. 1A, graphical user interface elements 105 contain sensitive information, such as PII. For example, graphical user interface element 105A contains a user's name, graphical user interface element 105B contains a user's phone number, and graphical user interface element 105C contains a user's address. Generally, graphical user interface elements 105 may include, for example, sensitive information including name, social security number, date and place of birth, biometric records, medical, educational, financial, employment information, and the like. As depicted, sensitive information inputted or outputted on graphical user interface elements 105 may be visible on the graphical user interface 103 and present in an image data stream associated with the data displayed on the graphical user interface 103. Generally, an image data stream comprises data intended to be displayed on a user device, including data generated by a graphical user interface of the user device, where the graphical user interface may be associated with the device operating system, an application running on the device, or the like.

Virtual display 110 is configured to virtually render and/or display (e.g., not on a physical display device) image data that is likewise intended to be displayed on a physical display of user device 102.

In the depicted example, virtual display 110 virtually displays image layer 104 and mask layer 106. In other words, virtual display 110 in this example is capable of rendering multiple layers of image data. While shown side-by-side in FIG. 1A for convenience, virtual display 110 may store image data in a stacked or other form. Image layer 104 comprises the image data stream associated with the graphical user interface 103, including any graphical user interface elements 105. Thus, a screen capture recording of image layer 104 when it contains graphical user interface elements 105 including PII will likewise include sensitive information present in the image data stream.

Mask layer 106 is configured to mask sensitive information in the image data stream using mask elements 107, which are discretely defined portions of a virtual display that are to be masked. For example, a mask element may be defined based on absolute or relative coordinates (e.g., pixel coordinate). A mask element may be generally take any shape, such as any polygonal shape, up to and including a shape that represents the entire display size.

Generally, a mask layer may exist in different states. For example, mask layer 106 may be stable (e.g., in a stable state) meaning mask elements 107 in mask layer 106 are generally not changing (e.g., absolutely or subject to some threshold) from one time increment to the next. As another example, mask layer 106 may be in an uncertain state, meaning it is not known whether mask elements in mask layer 106 are changing or not. As yet another example, mask layer 106 may be unstable (e.g., in an unstable state) meaning mask elements are known to be changing, such as when sensitive information associated with a mask element is moving as part of a graphical user interface transition. In FIG. 1A, mask layer 106 is depicted in a stable state because mask elements 107 are idle in the example user interface.

Determining mask layer state is described in further detail in FIGS. 2A and 2B, discussed below.

As depicted, mask layer 106 comprises mask elements 107A-C (collectively, mask elements 107) that correspond to graphical user interface elements 105, or portions thereof, containing sensitive information. Mask elements 107 do not mask graphical user interface elements, or portions thereof, without sensitive information, and thus may be considered fine or precise masks. For example, graphical user interface element 105A contains the text "NAME: JOHN SMITH" and a portion of that element, "JOHN SMITH" is PII, while the other portion, a label in this case, is not sensitive. Note that in this case the label and the information associated with the label is described as a single graphical user element, but in other examples, they may be considered separate graphical user interface elements.

In some embodiments, mask elements 107 are determined based on data associated with each of graphical user interface elements 105. Determining elements of the graphical user interface to be masked is discussed in further detail with respect to FIG. 3.

A screen capture function or application may be configured to create screen capture recording 108A, which records virtual display 110 (e.g., from an image data buffer) with mask layer 106 overlaid on image layer 104. Thus, the recording includes only masked elements 107 and any unmasked portions of the graphical user interface 103. Beneficially then, any sensitive information depicted in image layer 104 is not captured in the screen capture recording 108A, maintaining protection of PII, while non-sensitive information is retained in screen capture recording 108A. Moreover, because the masking is done on virtual display 110, there is no effect on what is actually displayed to the user of user device 102. In other words, the masking is transparent to the user and to the image data that is actually displayed on the physical device screen.

Note that while the example in FIG. 1A depicts mask elements 107 masking portions of graphical user interface elements 105, in other embodiments, one or more mask elements 107 may mask a subset of graphical user interface elements 105, additional graphical user interface elements 105, fewer graphical user interface elements and the like. Though not depicted in FIG. 1A, graphical user interface elements 105 may include any other graphical user interface elements such as text, images, drop downs, fillable forms, etc.

Figure 1B:
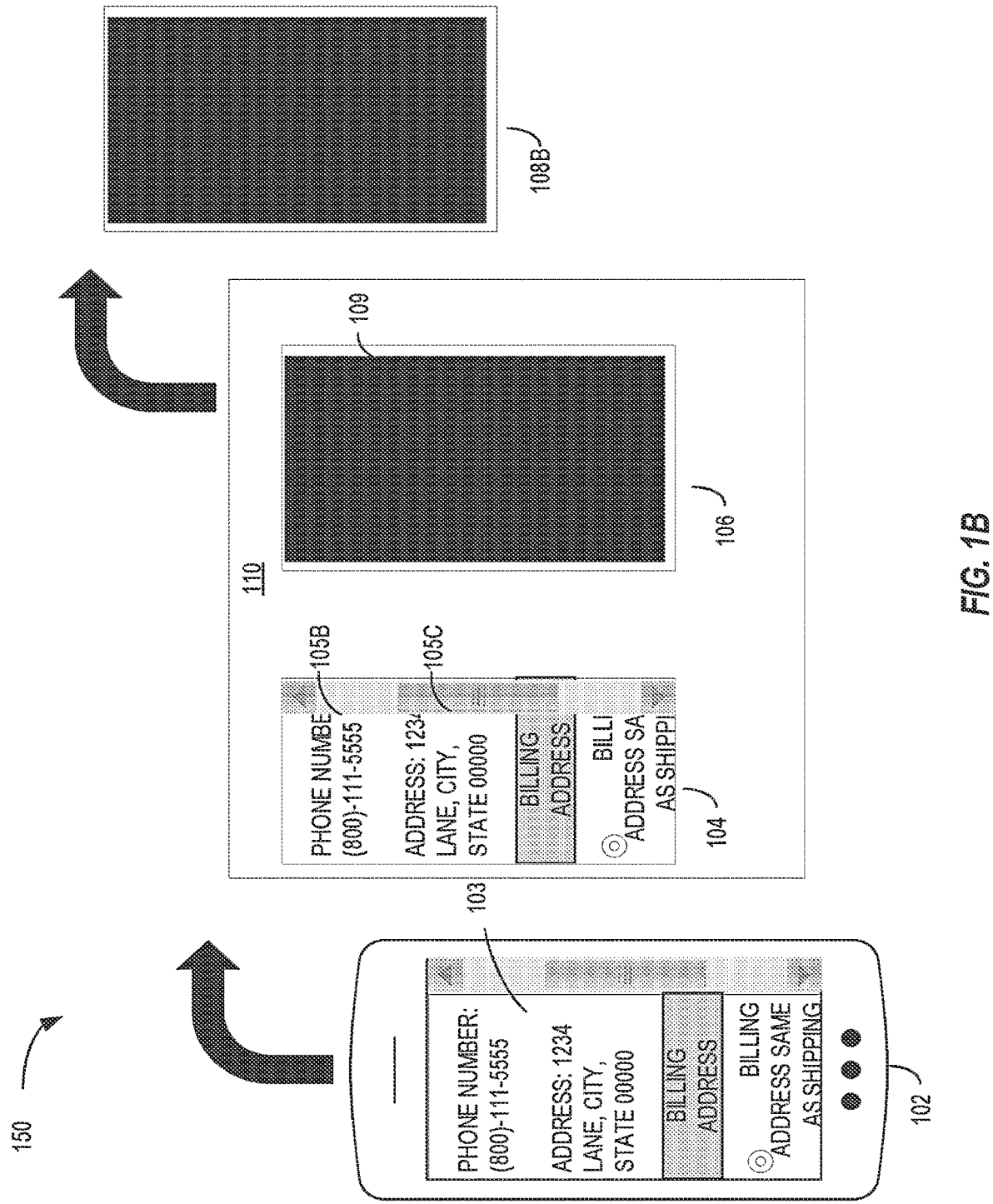

FIG. 1B depicts various aspects of another screen capture recording flow 150 in which mask layer 106 comprises an emergency mask 109 (a type of mask element) configured to mask all information in the image data stream (e.g., configured to mask the entire image data layer of virtual display 110).

Generally, all like numbered aspects of FIG. 1B are as described in FIG. 1A. However, FIG. 1B, depicts a masking method that may be used when a graphical user interface is changing (e.g., in an unstable or uncertain state). For example, emergency mask 109 may be added to mask layer 106 to ensure all sensitive information is masked during dynamic changes to user interface 103 (e.g., scroll events, layout change events, and layout change overload events). A graphical user interface layout overload generally refers to a condition in which rapid successive changes to the graphical user interface prevent determining which portions of the user interface need masking.

Specifically, in the example depicted in FIG. 1B, graphical user interface 103 is undergoing a scrolling event that results in the graphical user interface elements 105 moving on the graphical user interface 103. Like in FIG. 1A, virtual display 110 virtually displays image layer 104 and mask layer 106. Because the scroll event results in movement of the various graphical user interface elements 105, sensitive information may not reliably be masked by the precise mask elements 107 (in FIG. 1A). To prevent any sensitive information from becoming unmasked and ultimately captured in screen capture recording 108B, emergency mask 109 is added to mask layer 106 to mask all information in the image data stream. The determination to use fine or coarse masks, such as depicted and described with respect to FIGS. 1A and 1B, respectively, may be based on determining a state of mask layer 106. The different mask layer states thus beneficially ensure that all sensitive information remains behind a mask, such as mask elements 107 in FIG. 1A and emergency mask 109 in FIG. 1B, as a user navigates through the graphical user interface 103. Mask layer states and transitions between states are described in further detail in FIGS. 2A and 2B, discussed below.

Screen capture recording 108B records the result of overlaying mask layer 106 on image layer 104 in virtual display 110 thereby recording only emergency mask 109. Thus, no sensitive information may be captured in screen capture recording 108B, maintaining protection of PII.

Beneficially, deploying emergency mask 109 maintains protection of sensitive information in the screen capture recording 108B, while also maintaining consistent user experience by allowing the graphical user interface 103 to be fluidly updated (e.g., scroll smoothly).

Example Process for Determining Mask Layer State

Figure 2A:
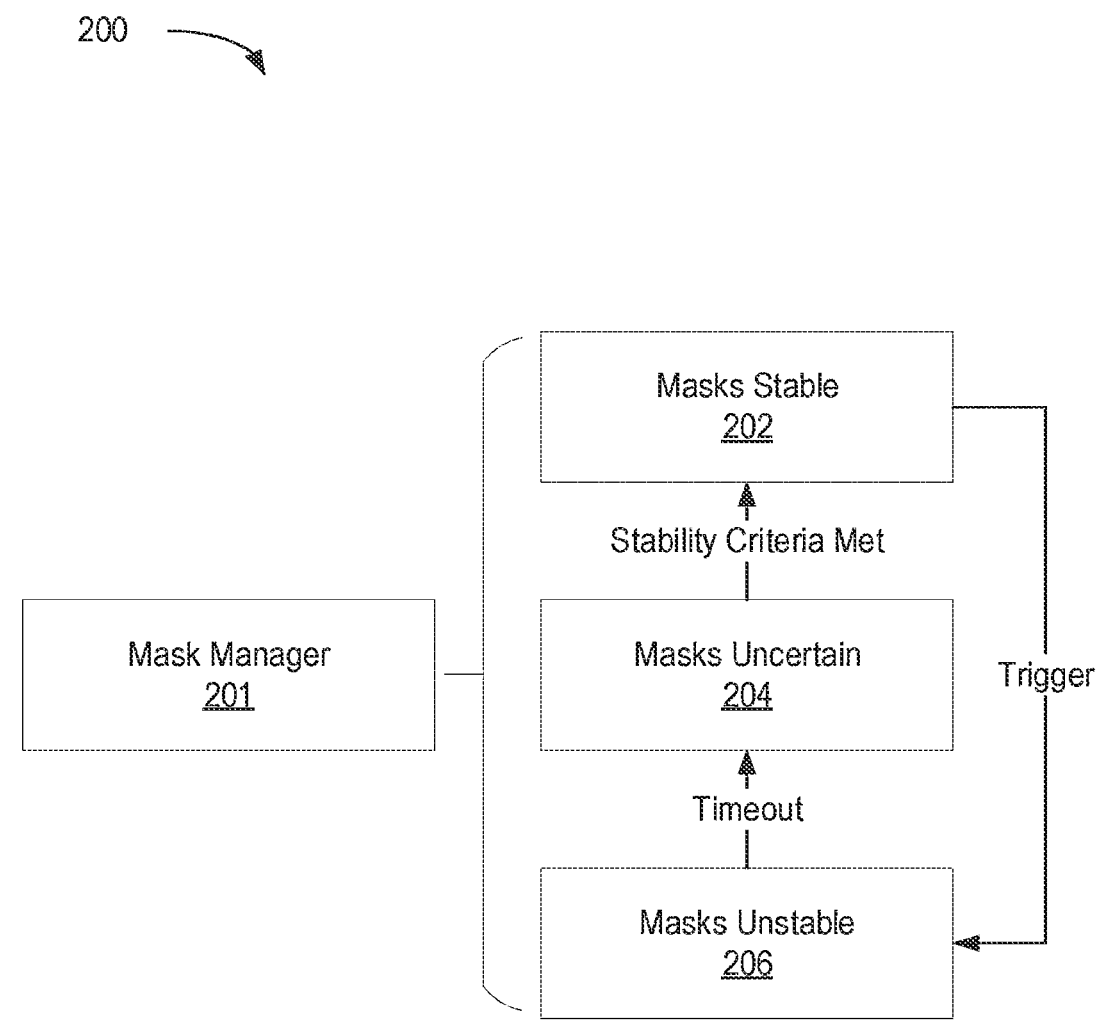
FIG. 2A depicts an example process flow for determining a mask layer state.

FIG. 2A depicts an example process flow 200 for determining a mask layer state such as for mask layer 106, as described with respect to FIGS. 1A-1B.

As described above, a mask layer may be considered to have different states, such as stable, uncertain, or unstable. A stable mask layer is generally one in which the mask elements are static from one time increment to the next, either absolutely, or subject to some movement threshold. An uncertain mask layer is one in which it is not known whether the mask elements are changing or not, such as when the graphical user interface is being changed (e.g., moved, scrolled, interacted with, redrawn, scaled, or the like). An unstable mask layer is one in which the mask elements are known to be changing.

FIG. 2A depicts an example process flow between three example mask layer states: stable, uncertain, and unstable. Note that in other examples, it is possible to implement additional or fewer mask states. For example, in an alternative embodiment, the mask layer stable state 202 and mask layer unstable state 212 may be the only two states. Generally, the state of the mask layer may be used to determine which type of masking to perform, such as fine masking of graphical user interface elements (or portions thereof), such as depicted in FIG. 1A, or coarse masking of an entire graphical user interface, or a significant portion thereof, such as depicted in FIG. 1B.

In some embodiments, mask layer state may be determined, for example, by a mask manager 201.

In one example, a mask manger component 201 may determine mask layer state to be stable at 202 because all mask elements on a mask layer are the same (either absolutely or subject to some threshold) at a first time and a second time (e.g., over a set time consideration interval or window). When in a stable mask layer state, all sensitive information remains masked by mask elements (e.g., mask elements 107 in FIG. 1A) during the stable time interval such that no sensitive information (e.g., PII) is recorded in a screen capture recording (e.g., screen capture recording 108A in FIG. 1A) during the stable time interval.

Upon a triggering event (or trigger), mask manager 201 may determine mask layer state to be unstable at 206. In some embodiments, a triggering event between mask layer states may be based on a change in the graphical user interface, such as a scroll event, a layout change, or a layout change overload. For example, a scroll event in the graphical user interface may be where a user scrolls through the graphical user interface, such as a user scrolling through a list of products on a retail application displayed on the graphical user interface. In another example, a layout change may be where a new view is added to the view hierarchy of the graphical user interface, including new graphical user interface elements, such as a when a user presses an "Add delivery address" button on a form and an address field is added to the form. In yet another example, a layout change overload may be where the graphical user interface undergoes rapid successive changes, such as where one layout change erroneously prompts another layout change.

After a timeout, which may be determined by a timer being set, running, and expiring, mask manager 201 may determine mask layer state to be uncertain at 204. When mask stability requirements have been met, mask manager 201 determines mask layer state to be stable. For example, mask stability requirements may require all mask elements on a mask layer to be the same (either absolutely or subject to some threshold) at a first time and a second time (e.g., over a set time consideration interval or window). In some cases, the similarity of masks from one time to another may be compared based on absolute or relative position (e.g., screen coordinates) and size (e.g., calculated by dimension of each side of a polygon, area, or the like).

Note that flow 200 is just one example, and other flows having additional, fewer, alternative, or differently ordered steps may be implemented.

Figure 2B:
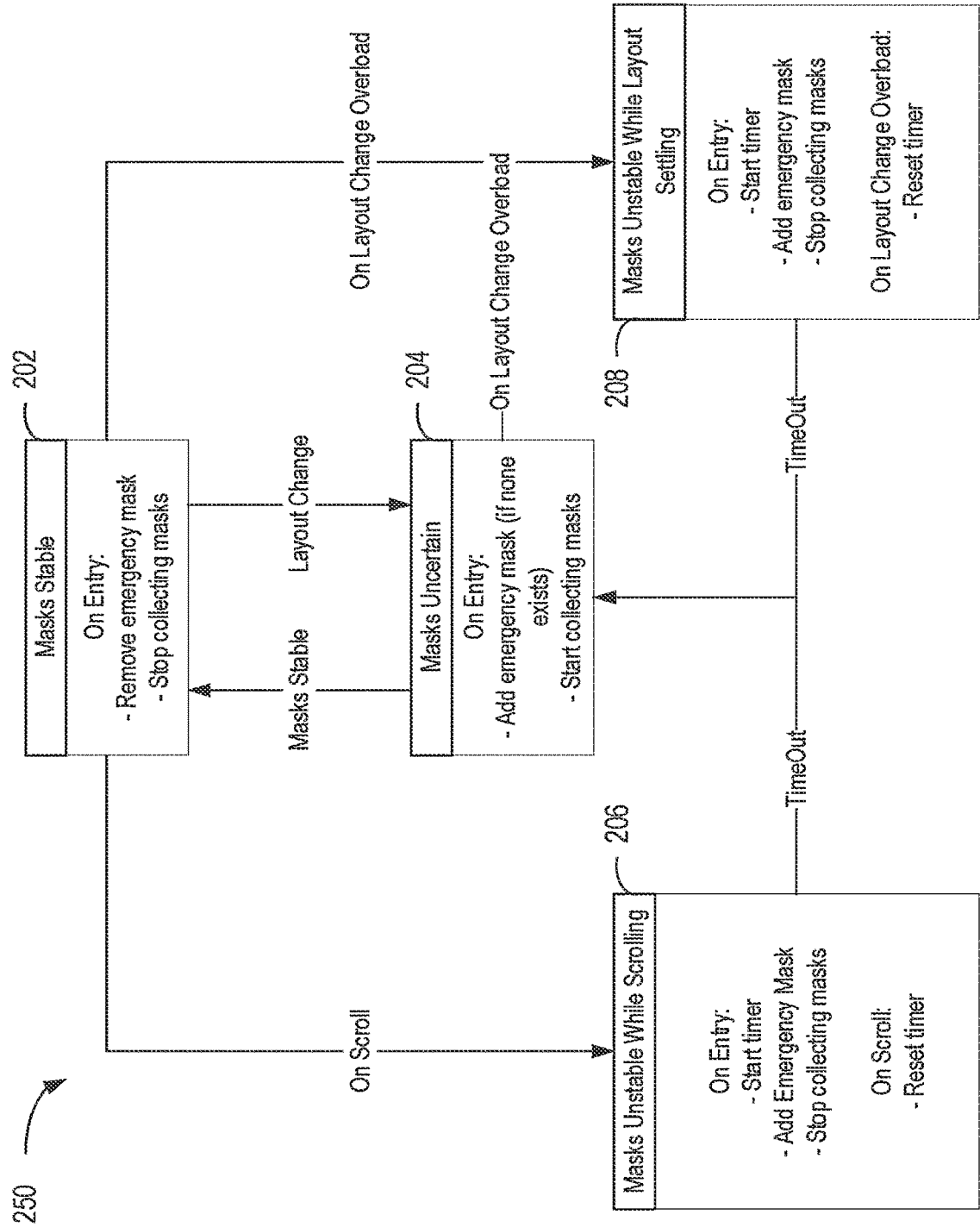
FIG. 2B depicts another example process flow for determining a mask layer state.

FIG. 2B depicts another example process flow for determining a mask layer state, such as for mask layer 106, as described in FIGS. 1A-1B. Generally, all like numbered aspects of FIG. 2B are described in FIG. 2A.

Generally, upon entering stable state 202, various aspects of a mask layer in a virtual display may be changed. For example, any emergency mask (e.g., emergency mask 109 in FIG. 1B), is removed because all graphical user interface elements (e.g., graphical user interface elements 105 in FIG. 1A) containing sensitive information can be masked deterministically. Further, determination (or collection) of new mask elements for the mask layer is discontinued because it is known that the mask layer, and thus its elements, are stable.

In one example, a mask layer state transitions from mask stable 202 to mask uncertain state 204 based on a layout change in the graphical user interface. Upon entering uncertain state 204, various aspects of the mask layer in a virtual display may be changed. For example, an emergency mask (e.g., emergency mask 109 in FIG. 1B), may be added to ensure any sensitive information remains masked to avoid sensitive information becoming revealed if the graphical user interface and associated mask elements are changing. Note that if transitioning to the uncertain state 222 from an unstable state, such as masks unstable while scrolling 206 or masks unstable while layout settling 208, via a timeout, an emergency mask layer may already be in place in which case a new emergency mask need not be added.

Further, a new set of mask elements may be determined (or collected) for the mask layer at 204. In some cases, the set of mask elements may be indicated and/or stored as a list of mask elements. If the new set of mask elements (determined based on the graphical user interface) are found to be stable, such as where the new set of mask elements corresponds to the previous set of mask elements, then the mask layer state transitions back to stable state at 202.

In another example, a mask layer state transitions from mask stable 202 to masks unstable while scrolling 206, based on a scroll event in the graphical user interface. Upon entering masks unstable while scrolling state 206, various aspects of the mask layer in a virtual display may be changed. For example, a timer is started to allow the graphical user interface to settle following the scroll event. Further, if another scroll event occurs in the masks unstable while scrolling state 206, the timer is reset to allow the graphical user interface to settle following the most recent scroll event.

Additionally, an emergency mask (e.g., emergency mask 109 in FIG. 1B), is added to ensure any sensitive information remains masked while the graphical user interface and associated mask elements are being scrolled at 206. Further, no new mask elements are collected for the mask layer at 206, because stopping collection of mask elements avoids expending processing time and resources where it is known that the mask elements may quickly become invalid due to scrolling in the graphical user interface.

Upon expiration of the timer (e.g., a timeout), the mask layer state transitions to masks uncertain 204, discussed above.

In yet another example, a mask layer state transitions from either mask stable 202 or masks uncertain 204 to masks unstable while layout settling 208, based on a layout change overload. Upon entering masks unstable while layout settling 208, various aspects of the mask layer in a virtual display may be changed. For example, a timer is started to allow the graphical user interface to settle following the layout change overload event. Further if another layout change overload even occurs while in the masks unstable while layout settling state 208, the timer is reset to allow the graphical user interface to settle following the most recent layout change overload event.

Further, an emergency mask (e.g., emergency mask 109 in FIG. 1B), may be added at to ensure any sensitive information remains masked to avoid sensitive information becoming revealed if the graphical user interface and associated mask elements are changing. Note that if transitioning to the masks unstable while layout settling state 208 from the mask uncertain state 204, an emergency mask layer may already be in place in which case a new emergency mask need not be added. Additionally, no new mask elements are collected for the mask layer at 208, because stopping collection of mask elements, avoids expending processing time and resources where it is known that the mask elements may quickly become invalid due to the layout change overload in the graphical user interface.

Upon timeout of the timer, the mask layer state transitions to masks uncertain 204, discussed above.

Note that flow 250 is just one example, and other flows having additional, fewer, alternative, or differently ordered steps may be implemented.

Example Creation of a Mask Layer Process Flow

Figure 3:
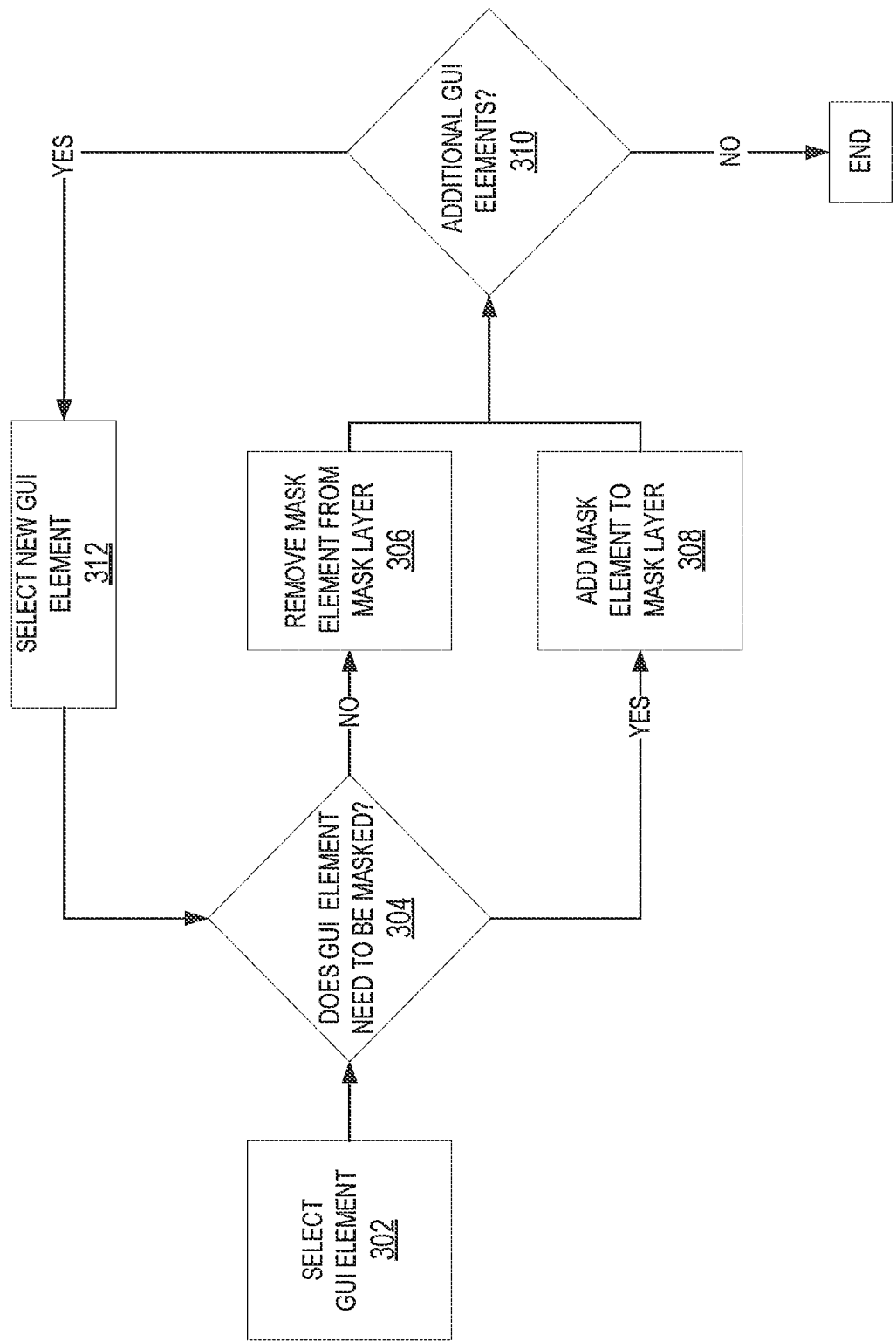
FIG. 3 depicts an example process flow for determining mask elements.

FIG. 3 depicts an example process flow 300 for determining mask elements (e.g., mask elements 107 in FIG. 1A) for a mask layer (e.g., mask layer 106 in FIGS. 1A-1B). In one example, flow 300 may be implemented by a mask manager component, such as mask manager 201 described with respect to FIG. 2A, to determine one or more mask elements, or sets of mask elements, such as mask elements collected while in mask uncertain state 204, as described with respect to FIG. 2B.

Generally, a graphical user interface element (such as graphical user interface elements 105 in FIG. 1) may be indicated as needing to be masked, not needing to be masked, or possibly needing to be masked. For example, any sort of programmatic indication, such as metadata, a flag, a configuration setting, a register, or the like, associated with the graphical user interface element may indicate the appropriate masking behavior for the element.

Generally, a graphical user interface indicated as needing to be masked is a graphical user interface element, such as a form field, that is expected to contain sensitive information, such as PII. A graphical user interface element indicated as not needing to be masked is a user interface element that is not expected to contain sensitive information, such as a graphic, text block, control, or the like, which does not (or cannot) include sensitive information. A graphical user interface element that possibly needs masking may be a graphical user interface element that may, but will not always, include sensitive information, such as an unstructured text field. In some embodiments, a further processing element, such as a predictive model, may analyze graphical user interface elements that possibly need masking and make a masking determination (e.g., needs masking or does not need masking).

Flow 300 begins at 302 by selecting a graphical user interface element, such as one or more of graphical user interface elements 105 in FIGS. 1A-1B. In various embodiments, graphical user interface elements may include windows, menus, icons, controls, widgets, tabs, and the like. In some cases, selecting a graphical user interface element may include selecting the first node in a tree or graph-type structure as the first step in a traversal routine of that structure.

Flow 300 then proceeds to step 304 by determining whether the graphical user interface element needs to be masked. Determining whether the graphical user interface element needs to be masked may be based on various attributes of the graphical user interface element which, for example, may explicitly or implicitly indicate the graphical user interface element needs (or does not need) to be masked.

For example, in some embodiments, determining whether a graphical user interface element needs to be masked is based on: metadata associated with the graphical user interface element; a control type associated with the graphical user interface element; whether or not the graphical user interface element accepts user input; and manual tagging identifying the graphical user interface element as explicitly masked or unmasked, to name a few examples. Other methods are possible, such as a predictive model (e.g., a trained machine learning model or a rules-based model) that analyzes the mask element and determines whether or not the element needs masking.

If the graphical user interface element does not need to be masked (Step 304=NO), flow 300 proceeds to step 306 with removing any associated mask element (e.g., mask elements 107 in FIG. 1A) associated with the graphical user interface element from the mask layer (e.g., mask layer 106 in FIG. 1A).

If the graphical user interface element does need to be masked (Step 304=YES), then flow 300 proceeds to step 308 with adding a mask element (if one does not already exist) associated with the graphical user interface element to the mask layer.

In either event, flow 300 then proceeds to step 310 with determining whether there are any additional graphical user interface elements to be considered. For example, if the current graphical user interface element has any sub-elements, or if there are other branches or nodes in a tree or graph-structure representative of the graphical user interface, then a new element will be selected (e.g., according to a traversal strategy) at 312.

Sub-elements of a graphical user interface element may include, for example, children elements, grandchildren elements, etc., such as may be indicated in a graphical user interface hierarchy. Thus, checking for sub-elements may be considered an aspect of traversing a structure representing the graphical user interface.

If there are additional graphical user interface elements to be considered (Step 310=YES), then flow 300 selects a new graphical user interface element at 312 and returns to step 304 for further processing. Generally then, flow 300 may be repeated until all graphical user interface elements are considered (e.g., after an entire structure representing the graphical user interface is traversed).

If there are no additional graphical user interface elements to be considered (Step 310=NO), then flow 300 ends. At the end of the flow, there is a set of mask elements that may be drawn to a mask layer, such as mask layer 106 of FIG. 1. Further, the new set of mask elements generated by flow 300 may be compared to a previous set of mask elements to determine whether the mask elements are stable, such as described above with respect to FIG. 2A-2B.

Note that flow 300 is just one example, and other flows having additional, fewer, alternative, or differently ordered steps may be implemented.

Example Method for Masking Sensitive Information in a Data Streams

Figure 4:
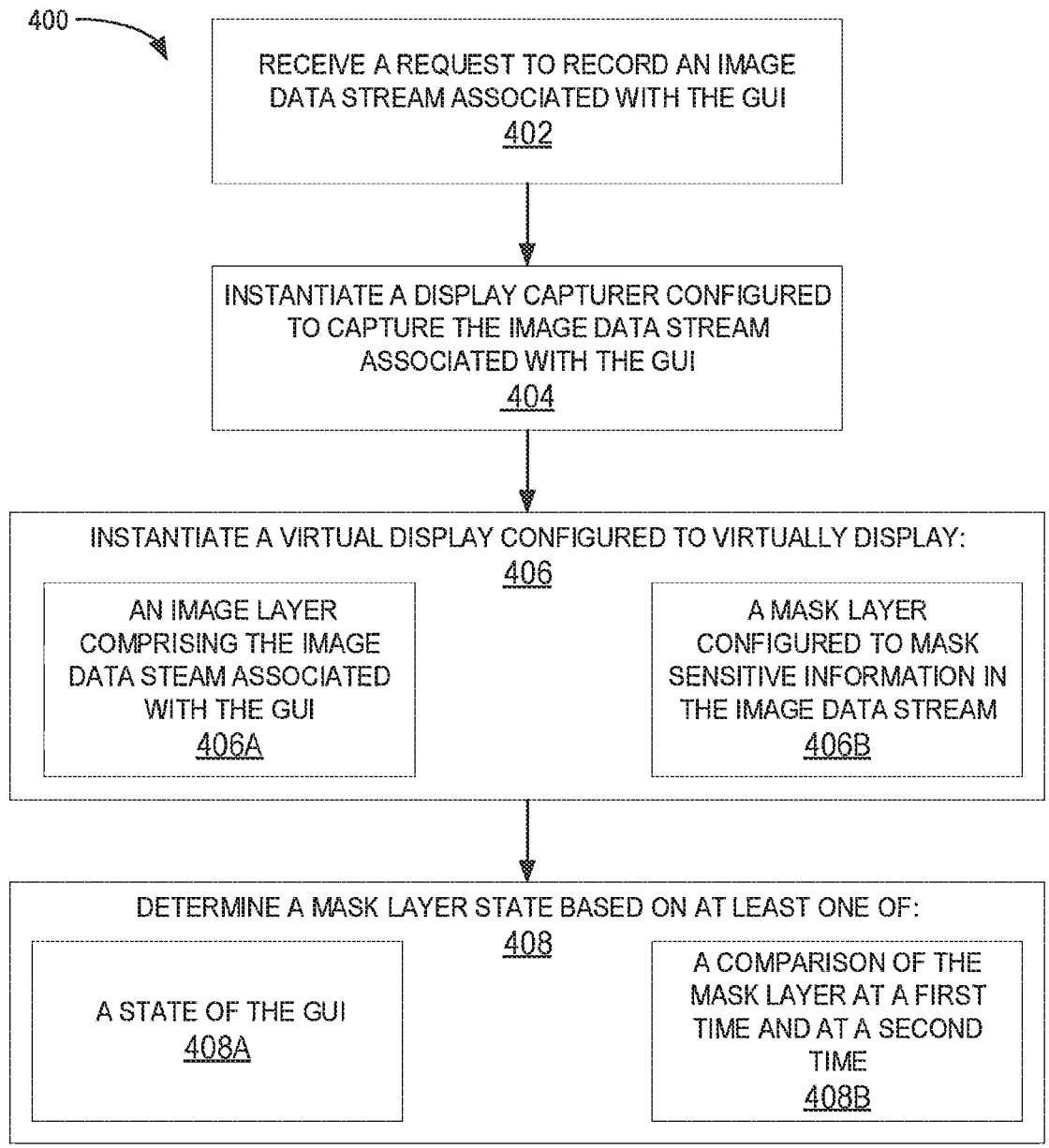
FIG. 4 depicts an example flow for masking sensitive information in a data stream.

FIG. 4 depicts an example method 400 for masking sensitive information in a data stream, such as for a screen capture recording as described with respect to FIGS. 1A-3, discussed above.

Method 400 begins at step 402 with receiving a request to record an image data stream associated with a graphical user interface. In some examples, the image data stream is the on-screen display of the graphical user interface 103, as described above with respect to FIGS. 1A-1B.

Method 400 then proceeds to step 404 with instantiating a display capturer configured to capture the image data stream associated with the graphical user interface. For example, "instantiate" may mean to create an instance or particular realization of a capturer, such as through a class of objects or processes. In one example, the display capturer captures the image data stream associated with the graphical user interface 103, including graphical user interface elements 105 containing sensitive information, as described above with respect to FIGS. 1A-1B.

Method 400 then proceeds to step 406 with instantiating a virtual display configured to virtually display both an image layer 406A comprising the image data stream associated with the graphical user interface and a mask layer 406B configured to mask sensitive information in the image data stream. In one example, virtual display 110 comprises image layer 104 and mask layer 106, such as those described with respect to FIGS. 1A-1B, where image layer 104 displays the image data stream associated with the graphical user interface 103 and mask layer 106 displays one or more mask elements 107.

In some embodiments, creating the mask layer for the virtual display comprises traversing a graphical user interface hierarchy associated with the graphical user interface to determine one or more graphical user interface elements to be masked. For example, flow 300 described with respect to FIG. 3, may be performed at step 406 for creating the mask layer. In some embodiments, method 400 further comprises determining the one or more graphical user interface elements to be masked based on at least one of: metadata associated with the one or more graphical user interface elements; or a control type associated with the one or more graphical user interface elements. For example, the mask layer (e.g., mask layer 106 in FIG. 1A) for the virtual display (e.g., virtual display 110 in FIG. 1A), may be created based on the set of graphical user interface elements determined to be masked.

Method 400 then proceeds to step 408 with determining a mask layer state based on at least one of a state 408A of the graphical user interface and a comparison 408B of the mask layer at a first time and at a second time.

In some embodiments, the mask layer state comprises a stable state (e.g., mask stable 202 in FIGS. 2A-2B), and method 400 further comprises: removing any emergency mask from the mask layer; and discontinuing collection of mask elements for the mask layer. For example, an emergency mask (e.g., emergency mask 109 in FIG. 1B) may be removed from the mask layer and collection of mask elements for the mask layer is discontinued.

In some embodiments, method 400 further comprises setting the mask layer state to an unstable state (e.g., masks unstable 206 of FIG. 2A), based on a change to the graphical user interface. In some embodiments, the change to the graphical user interface comprises at least one of: a scroll event in the graphical user interface; or a layout overload in the graphical user interface. In one example, a change to the graphical user interface may be similar to the scroll event displayed on graphical user interface 103, as described with respect to FIG. 1B.

In some embodiments, the mask layer state comprises an uncertain state (e.g., masks uncertain 204 of FIG. 2A), and method 400 further comprises: adding an emergency mask to the mask layer, and determining a first set of mask elements for the mask layer. For example, an emergency mask (e.g., emergency mask 109 in FIG. 1B) may be added to the mask layer (e.g., mask layer 106 in FIGS. 1A-1B), and a first set of mask elements for the mask layer are determined. Flow 300, described with respect to FIG. 3, may be performed at step 408 for determining a first (e.g., new) set of mask elements for the mask layer.

In some embodiments, method 400 further comprises setting the mask layer state to an unstable state based on a change to the graphical user interface. For example, the mask layer state may be set to an unstable state, such as unstable state 206 of FIG. 2A. A change to the graphical user interface may include, for example, a scroll event, a layout overload, and the like.

In some embodiments, method 400 further comprises setting the mask layer state to a stable state based on determining a first set of mask elements for the mask layer at a first time correspond to a second set of mask elements for the mask layer at a second time. For example, the mask layer state may be set to a stable state, such as stable state 202 of FIG. 2A, and a second set of mask elements may be compared to a first set of mask elements.

In some embodiments, the mask layer state comprises an unstable state (e.g., masks unstable 206 of FIG. 2A), and method 400 further comprises: adding an emergency mask to the mask layer; discontinuing collection of mask elements for the mask layer; and resetting a state transition timeout. For example, an emergency mask (e.g., emergency mask 109 in FIG. 1B) may be added to the mask layer (e.g., mask layer 106 in FIGS. 1A-1B), collection of mask elements for the mask layer (e.g., mask elements 107 for mask layer 106 in FIG. 1A), is discontinued, and a state transition timeout is reset.

In some embodiments, method 400 further comprises setting the mask layer state to an uncertain state after expiration of the state transition timeout. For example, mask layer state may be set to an uncertain state (e.g., uncertain state 204 in FIG. 2A) after expiration of a state transition timer.

In some embodiments, method 400 further comprises recording the image data stream from the virtual display including the mask layer, such as shown in screen capture recording 108A and 108B of FIGS. 1A and 1B, respectively.

In some embodiments, the image data stream from the virtual display including the mask layer comprises no sensitive information. For example, screen capture recording 108A records the virtual display 110 and contains no sensitive information because mask layer 106 masks all sensitive information displayed on the image layer 104, as described with respect to FIGS. 1A-1B.

Note that method 400 is just one example, and other methods having additional, fewer, alternative, or differently ordered steps may be implemented.

Example Processing System

Figure 5:
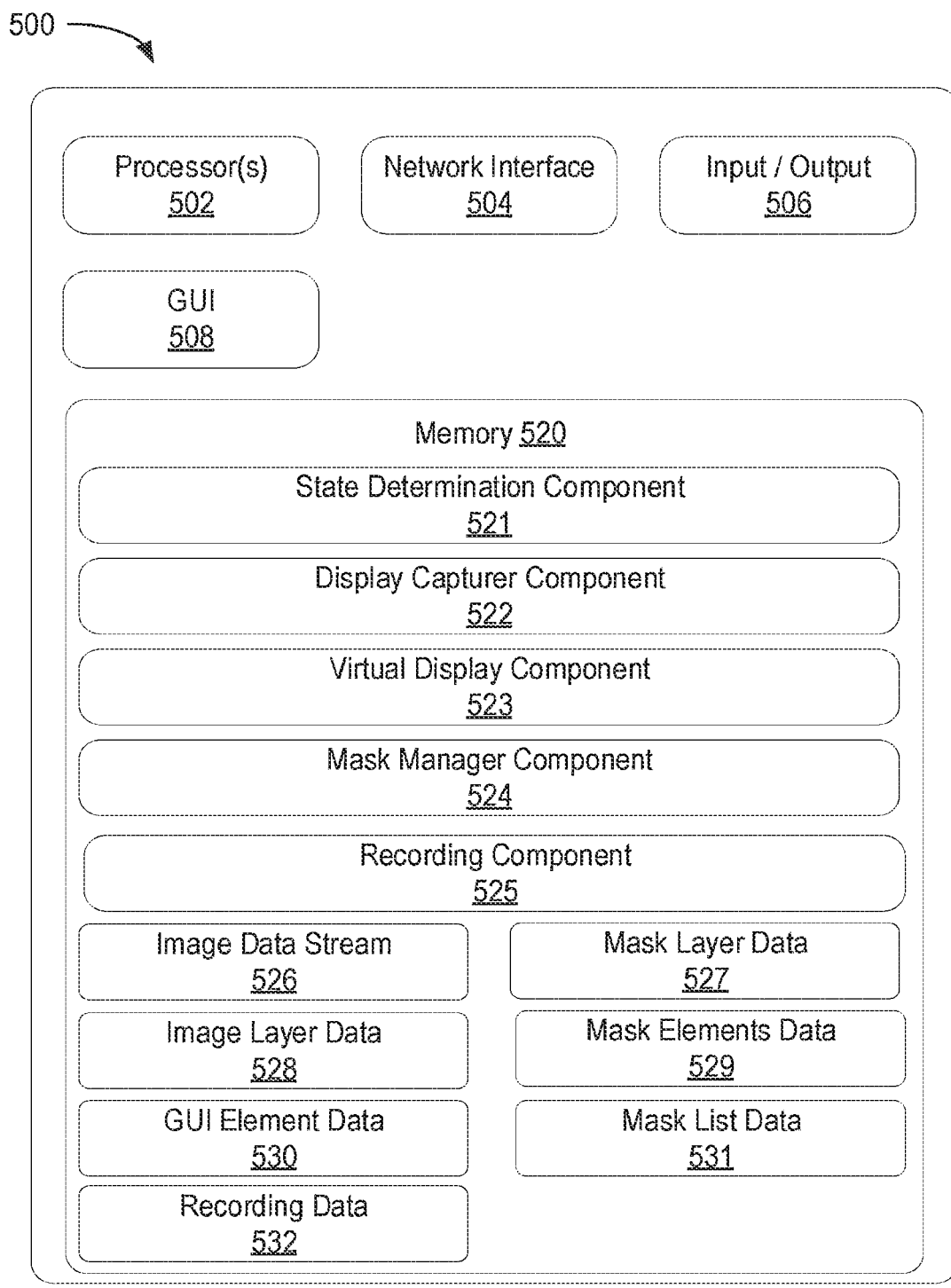
FIG. 5 depicts an example processing system configured to perform the methods described herein.

FIG. 5 depicts an example processing system 500 configured to perform the methods described herein.

Processing system 500 includes one or more processors 502. Generally, a processor 502 is configured to execute computer-executable instructions (e.g., software code) to perform various functions, as described herein.

Processing system 500 further includes a network interface 504, which generally provides data access to any sort of data network, including local area networks (LANs), wide area networks (WANs), the Internet, and the like.

Processing system 500 further includes input(s) and output(s) 506, which generally provide means for providing data to and from processing system 500, such as via connection to computing device peripherals, including user interface peripherals.

Processing system 500 further includes a graphical user interface 508. In some embodiments, the graphical user interface comprises a plurality of graphical user interface elements, each respective user interface element of the plurality of user interface elements is configured to receive an input or display an output.

Processing system 500 further includes a memory 520 comprising various components. In this example, memory 520 includes a state determination component 521, a display capturer component 522 a virtual display component, a recording component 524, a mask manger component 524, image data stream 526, mask layer data 527, image layer data 528, mask elements 529, graphical user interface element data 530, mask list data 531, and recording data 532.

Processing system 500 may be implemented in various ways. For example, processing system 500 may be implemented within on-site, remote, or cloud-based processing equipment. Note that in various implementations, certain aspects may be omitted, added or substituted from processing system 500.

EXAMPLE CLAUSES

Implementation examples are described in the following numbered clauses:

Clause 1: A method of masking sensitive information in a data stream, comprising receiving a request to record an image data stream associated with a graphical user interface; instantiating a display capturer configured to capture the image data stream associated with the graphical user interface; instantiating a virtual display configured to virtually display: an image layer comprising the image data stream associated with the graphical user interface; and a mask layer configured to mask sensitive information in the image data stream; and determining a mask layer state based on at least one of: a state of the graphical user interface; or a comparison of the mask layer at a first time and at a second time.

Clause 2: The method of Clause 1, wherein: the mask layer state comprises a stable state, and the method further comprises: removing any emergency mask from the mask layer; and discontinuing collection of mask elements for the mask layer.

Clause 3: The method of any one of Clauses 1-2, further comprising setting the mask layer state to an unstable state based on a change to the graphical user interface.

Clause 4: The method of Clause 3, wherein the change to the graphical user interface comprise at least one of: a scroll event in the graphical user interface; or a layout overload in the graphical user interface.

Clause 5: The method of any one of Clauses 1-4, wherein the mask layer state comprises an uncertain state, and the method further comprises: adding an emergency mask to the mask layer; and determining a first set of mask elements for the mask layer.

Clause 6: The method of Clause 5, further comprising setting the mask layer state to an unstable state based on a change to the graphical user interface.

Clause 7: The method of Clause 5, further comprising setting the mask layer state to a stable state based on determining the first set of mask elements for the mask layer at a first time correspond to a second set of mask elements for the mask layer at a second time.

Clause 8: The method of any one of Clause 1-7, wherein: the mask layer state comprises an unstable state, the method further comprises: adding an emergency mask to the mask layer; discontinuing collection of mask elements for the mask layer; and resetting a state transition timeout.

Clause 9: The method of Clause 8, further comprising setting the mask layer state to an uncertain state after expiration of the state transition timeout.

Clause 10: The method of Clause 1-9, wherein creating the mask layer for the virtual display comprises traversing a graphical user interface element hierarchy associated with the graphical user interface to determine one or more graphical user interface elements to be masked.

Clause 11: The method of Clause 1-10, further comprising determining the one or more graphical user interface elements to be masked based on at least one of: metadata associated with the one or more graphical user interface elements; or a control type associated with the one or more graphical user interface elements.

Clause 12: The method of Clause 1-12, further comprising recording the image data stream from the virtual display including the mask layer.

Clause 13: The method of Clause 1-12, wherein the image data stream from the virtual display including the mask layer comprises no sensitive information.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium comprising computer-executable instructions that, when executed by a processor of a processing system, cause the processing system to perform a method in accordance with any one of Clauses 1-13.

Clause 17: A computer program product embodied on a computer-readable storage medium comprising code for performing a method in accordance with any one of Clauses 1-13.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c- or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operation illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or in the case, of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of masking sensitive information in a data stream, comprising:
   receiving a request to record an image data stream associated with a graphical user interface;
   instantiating a display capturer configured to capture the image data stream associated with the graphical user interface;
   instantiating a virtual display configured to virtually display:
      an image layer comprising the image data stream associated with the graphical user interface; and
      a mask layer configured to mask sensitive information in the image layer; and
   determining a mask layer state based on at least one of:
      a state of the graphical user interface; or
      a comparison of the mask layer at a first time and at a second time.

2. The method of claim 1, wherein:
   the mask layer state comprises a stable state, and
   in response to determining the mask layer state is the stable state, the method further comprises:
      removing any emergency mask from the mask layer; and
      discontinuing collection of mask elements for the mask layer.

3. The method of claim 2, further comprising setting the mask layer state to an unstable state based on a change to the graphical user interface.

4. The method of claim 3, wherein the change to the graphical user interface comprises at least one of:
   a scroll event in the graphical user interface; or
   a layout overload in the graphical user interface.

5. The method of claim 1, wherein:
   the mask layer state comprises an uncertain state, and
   in response to determining the mask layer state is the uncertain state the method further comprises:
      adding an emergency mask to the mask layer; and
      determining a first set of mask elements for the mask layer.

6. The method of claim 5, further comprising setting the mask layer state to an unstable state based on a change to the graphical user interface.

7. The method of claim 5, further comprising setting the mask layer state to a stable state based on determining the first set of mask elements for the mask layer at a first time correspond to a second set of mask elements for the mask layer at a second time.

8. The method of claim 1, wherein:
   the mask layer state comprises an unstable state,
   in response to determining the mask layer state is the unstable state the method further comprises:
      adding an emergency mask to the mask layer;
      discontinuing collection of mask elements for the mask layer; and
      resetting a state transition timeout.

9. The method of claim 8, further comprising setting the mask layer state to an uncertain state after expiration of the state transition timeout.

10. The method of claim 1, wherein creating the mask layer for the virtual display comprises traversing a graphical user interface element hierarchy associated with the graphical user interface to determine one or more graphical user interface elements to be masked.

11. The method of claim 10, further comprising determining the one or more graphical user interface elements to be masked based on at least one of:
   metadata associated with the one or more graphical user interface elements; or
   a control type associated with the one or more graphical user interface elements.

12. The method of claim 1, further comprising recording the image data stream from the virtual display including the mask layer.

13. The method of claim 12, wherein the image data stream from the virtual display including the mask layer comprises no sensitive information.

14. An apparatus configured for masking sensitive information in a data stream, comprising:
   a memory comprising computer-executable instructions; and
   a processor configured to execute the computer-executable instructions and cause the apparatus to:
      receive a request to record an image data stream associated with a graphical user interface;
      instantiate a display capturer configured to capture the image data stream associated with the graphical user interface;
      instantiate a virtual display configured to virtually display:
         an image layer comprising the image data stream associated with the graphical user interface; and
         a mask layer configured to mask sensitive information in the image layer; and determine a mask layer state based on at least one of:
a state of the graphical user interface; or
a comparison of the mask layer at a first time and at a second time.

15. The apparatus of claim 14, wherein the mask layer state comprises a stable state, and in response to a determination of the mask layer state is the stable state, the processor is further configured to cause the apparatus to:
remove any emergency mask from the mask layer; and
discontinue collection of mask elements for the mask layer.

16. The apparatus of claim 14, wherein the mask layer state comprises an uncertain state, and in response to a determination of the mask layer state is the uncertain state the processor is further configured to cause the apparatus to:
add an emergency mask to the mask layer; and
determine a first set of mask elements for the mask layer.

17. The apparatus of claim 14, wherein the mask layer state comprises an unstable state, and in response to a determination of the mask layer state is the unstable state, the processor is further configured to cause the apparatus to:
add an emergency mask to the mask layer;
discontinue collection of mask elements for the mask layer; and
reset a state transition timeout.

18. The apparatus of claim 14, wherein in order to create the mask layer for the virtual display, the processor is further configured to cause the apparatus to traverse a graphical user interface element hierarchy associated with the graphical user interface to determine one or more graphical user interface elements to be masked.

19. The apparatus of claim 14, wherein the processor is further configured to cause the apparatus to record the image data stream from the virtual display including the mask layer.

20. A non-transitory computer-readable medium comprising computer-executable instructions that, when executed by a processor of a processing system, cause the processing system to:
receive a request to record an image data stream associated with a graphical user interface;
instantiate a display capturer configured to capture the image data stream associated with the graphical user interface;
instantiate a virtual display configured to virtually display:
an image layer comprising the image data stream associated with the graphical user interface; and
a mask layer configured to mask sensitive information in the image layer,
determine a mask layer state based on at least one of:
a state of the graphical user interface; or
a comparison of the mask layer at a first time and at a second time; and
record the image data stream from the virtual display including the mask layer, wherein the image data stream from the virtual display including the mask layer comprises no sensitive information.

\* \* \* \* \*